(12) United States Patent
Mizumoto

(10) Patent No.: US 6,232,697 B1
(45) Date of Patent: May 15, 2001

(54) DRIVING APPARATUS AND EQUIPMENT COMPRISING DRIVING APPARATUS

(75) Inventor: Kenji Mizumoto, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/334,392

(22) Filed: Jun. 16, 1999

(30) Foreign Application Priority Data

Jun. 17, 1998 (JP) .................................................. 10-169474

(51) Int. Cl.⁷ .................................................. H01L 41/08
(52) U.S. Cl. ...................................... 310/317; 310/323.02
(58) Field of Search ........................ 310/323.01, 323.02, 310/323.03, 316.02, 317

(56) References Cited

U.S. PATENT DOCUMENTS

| | | | |
|---|---|---|---|
| 5,130,599 | * 7/1992 | Toda | 310/323.02 |
| 5,134,335 | * 7/1992 | Ikemoto et al. | 310/323.02 |
| 5,225,941 | 7/1993 | Saito et al. | 359/824 |
| 5,589,723 | * 12/1996 | Yoshida et al. | 310/323.02 X |
| 5,726,520 | * 3/1998 | Grahn | 310/323.02 X |

FOREIGN PATENT DOCUMENTS 10-039357    2/1998  (JP) .

* cited by examiner

*Primary Examiner*—Mark O. Budd
(74) *Attorney, Agent, or Firm*—Morrison & Foerster LLP

(57) ABSTRACT

An apparatus comprises first and second piezoelectric elements 25a, 25b each extending and contracting in a driving direction, a fixed member 32 secured to one end of each of the first and second piezoelectric elements 25a, 25b, first and second guide shafts 28a, 28b secured to the other ends of the respective first and second piezoelectric elements 25a, 25b to reciprocate with the extension and contraction of the aforesaid piezoelectric elements, first and second lens frames 21a, 21b held frictionally by the first and second guide shafts 28a, 28b, and a drive pulse generator for causing the slow and rapid displacements of each of the first and second piezoelectric elements 25a, 25b and outputting drive pulses such that a period during which the first piezoelectric element 25a undergoes rapid displacement does not coincide with a period during which the second piezoelectric element 25a undergoes rapid displacement.

18 Claims, 7 Drawing Sheets

DRIVING APPARATUS AND EQUIPMENT COMPRISING DRIVING APPARATUS

This application is based on application No. Hei 10-169474 filed in Japan, the content of which is hereby incorporated by reference.

BACKGROUND OF THE INVENTION

1. Field of the Invention

The present invention relates to a driving apparatus and equipment comprising the driving apparatus.

The present invention relates to a driving apparatus and equipment for moving a member e.g. the lens of a camera by means of a plurality of electro-mechanical transducer such as piezoelectric elements.

2. Description of the Prior Art

A description will be given to a conventional driving apparatus which performs linear driving by means of piezoelectric elements with reference to FIG. 11 showing a lens unit for driving a plurality of lenses. FIG. 11 is a perspective view of the lens unit.

201, 205 denote lens barrels for holding lenses. Shafts 202, 203 for slidably guiding the lens barrels 201, 225 in the direction of an optical axis extend through projections 201a, 201c, 225a, 225c formed integrally with the lens barrels 201, 225. The shafts 202, 203 have their respective near-front and near-rear end portions held slidably lengthwise thereof in respective holes formed in the upright portions 213a, 218a of support members 213, 218 and in respective holes formed in the upright portions 213c, 218c of the support members 213, 218.

The projections 201a, 201c, 225a, 225c are provided with leaf springs 214, 219 attached thereto with screws. The leaf springs 214, 219 are pressed against the shafts 202, 203, respectively. When the lens barrels 201, 225 move, therefore, they slide frictionally along the shafts 202, 203. Piezoelectric elements 212, 217 are attached to the respective rear end portions of the shafts 202, 203. The piezoelectric elements 212, 217 have respective rear end portions secured to the upright portions 213e, 218e of the support members 213, 218. The support members 213, 218 are secured to a common fixed portion.

The principle of operation of a moving mechanism using piezoelectric elements is disclosed in U.S. Pat. No. 5,225, 941 or the like, which will be described briefly with reference to the schematic diagram shown in FIG. 2. As shown in (a) section of FIG. 2, a shaft 53 is secured to one end of a piezoelectric element 52, while a fixed portion 51 is secured to the other end thereof. A moving member 54 to be moved is held on the shaft 53 under a frictional force produced by spring biasing. The mass of the fixed portion 51 is sufficiently large compared with the mass of the moving member 54.

When a voltage is applied to the piezoelectric element 52, the inertial force of the fixed portion 51 prevents the piezoelectric element 52 from extending in the direction of the fixed portion 51, so that the piezoelectric element 52 extends in the direction of the shaft 53 to move the shaft 53 to the left in the drawing. At this time, on a gentle rising edge of the applied voltage as shown in A section of FIG. 3, the moving member 54 moves by a distance x along with the shaft 53, as shown in (b) section of FIG. 2, since the frictional force produced between the moving member 54 and the shaft 53 is larger than the inertial force of the moving member 54.

Next, when the piezoelectric element 52 releases a voltage on a steep falling edge as shown in B section of FIG. 3, the inertial force of the moving member 54 becomes larger than the frictional force produced between the moving member 54 and the shaft 53, so that the moving member 54 remains in place and only the shaft 53 moves by the distance x toward the initial position, as shown in (c) section of FIG. 2. By applying a sawtooth drive pulse to the piezoelectric element 52 to cause it to repeat this action, the moving member 54 can be moved to a specified position. To move the moving member 54 in the opposite direction, a drive pulse with a steep rising edge and with a gentle falling edge is applied properly.

If the frequency of a waveform as shown in FIG. 3 is increased to increase a frequency for extending and contracting an electro-mechanical transducer, a transition is made to a state in which a skid occurs between the driving frictional member (shaft) and the moving member which are frictionally combined with each other upon each of the extension and contraction of the electro-mechanical transducer. In this case, since a relative skid occurring between the driving frictional member and the moving member upon the extension of the electro-mechanical transducer is different in direction and magnitude from the skid occurring therebetween upon the contraction of the electro-mechanical transducer, the moving member can be driven in a desired direction relative to the fixed portion.

In the lens driving apparatus having a structure as shown in FIG. 11, the piezoelectric elements 212, 217 extend and contract when a sawtooth drive pulse is applied thereto for a specified period of time, thereby causing the forward and backward movements of the shafts 202, 204. The order relationship between the frictional force between the shafts 202, 203 and the leaf springs 214, 219 and the inertial force resulting from the masses of the lenses and the lens barrels 201, 225 vary depending on the moving speeds of the shafts 202, 203, so that the lenses are moved to specified positions. It is to be noted that the force applied to the fixed portion upon the extension or contraction of the piezoelectric elements 212, 217 causes the fixed portion to reciprocate along with the support members 213, 218, though it is indistinct because of the relatively large mass of the fixed portion.

In FIG. 4, the vertical axis represents the magnitude of a voltage and the horizontal axis represents time. In the case where the drive pulses applied to the two piezoelectric elements 212, 217 have waveforms G1, G2 shown in FIG. 4 in which portions with abrupt voltage changes B1, B2 are coincident with each other, the forces are applied simultaneously to the fixed portion so that the respective driving operations interfere with each other.

For example, the fixed portion experiences an increased amount of elastic deformation and an increased amount of travel compared with the case where a single piezoelectric element and a single shaft are provided, so that the shafts 202, 203 (driving shafts) undergo a lower degree of acceleration.

occasionally, the inertial forces of the lens barrels 201, 225 (moving members) become smaller than the frictional forces, which deteriorates driving properties. As a result, the speeds of the lens barrels 201, 225 are lowered or, in some cases, the lens barrels 201, 225 are not moved at all. This leads to such a problem as an elongated time required to dispose the lenses at desired positions, which degrades the operability of a camera used in conjunction with the lens unit. Similar problems occur when three or more piezoelectric elements are used.

Although the description has thus been given to the case where the common fixed portion is used, interference occurs even when fixed portions are provided for individual piezoelectric elements on a one-by-one basis if the fixed portions are at positions close to each other. That is, if the voltages applied to the piezoelectric elements have the waveforms G1, G2 in which the portions B1, B2 with abrupt voltage changes are coincident with each other, as shown in FIG. 4, the forces are applied simultaneously to the fixed portions and therefore the forces are applied simultaneously to the lens unit in which the fixed portions are disposed.

This also deteriorates the driving properties for the lens barrels (moving members), similarly to the foregoing case. If the fixed portions contain elastic bodies such as plastic moldings, in particular, the fixed portions are likely to warp and move, so that the amount of elastic deformation experienced by the fixed portions is increased and the influence given to the driving of the moving members becomes greater.

SUMMARY OF THE INVENTION

It is therefore an object of the present invention to provide a driving apparatus for moving a moving member by means of two or more electro-mechanical transducers and equipment comprising the driving apparatus, wherein the driving properties for the moving member are prevented from deteriorating.

To attain the above object, one aspect of the present invention comprises: first and second electro-mechanical transducers each extending and contracting in a driving direction; first and second fixed portions secured to one ends of the respective first and second electro-mechanical transducers; first and second shafts secured to the other ends of the respective first and second electro-mechanical transducers to reciprocate with the extension and contraction of the aforesaid electro-mechanical transducers; first and second moving members held frictionally by the first and second shafts; and a drive pulse generator for causing the slow and rapid displacements of each of the first and second electro-mechanical transducers and outputting drive pulses such that a period during which the first electro-mechanical transducer undergoes rapid displacement does not coincide with a period during which the second electro-mechanical transducer undergoes rapid displacement.

In the arrangement, the drive pulses outputted from the drive pulse generator cause the slow and rapid displacements of each of the first and second electro-mechanical transducers and the first and second shafts undergo repeated slow and rapid displacements in association therewith, which moves the first and second moving members held frictionally by the first and second shafts. At this time, since the drive pulses are outputted such that the period during which the first electro-mechanical transducer undergoes rapid displacement does not coincide with the period during which the second electro-mechanical transducer undergoes rapid displacement, the forces exerted during the rapid displacements are prevented from being applied simultaneously to the first and second fixed members.

In another aspect of the present invention, the first and second electro-mechanical transducers in the aforesaid structure are piezoelectric elements.

In still another aspect of the present invention, the first and second fixed members are composed of a single member.

If the fixed members are formed of the single member, interference is more likely to occur. However, since the drive pulses are outputted such that the period during which the first electro-mechanical transducer undergoes rapid displacement does not coincide with the period during which the second electro-mechanical transducer undergoes rapid displacement, the forces exerted during the rapid displacements are prevented from being applied simultaneously to the single fixed member.

In yet another aspect of the present invention, a drive pulse for driving the second electro-mechanical transducer is outputted during the period in which no change occurs in the voltage applied the first electro-mechanical transducer.

In the arrangement, the period during which the drive pulse for the first electro-mechanical transducer is outputted is not coincident with the period during which the drive pulse for the second electro-mechanical transducer is outputted, so that the forces exerted by the first and second electro-mechanical transducers under slow and rapid displacements are prevented from being applied simultaneously to the fixed members.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
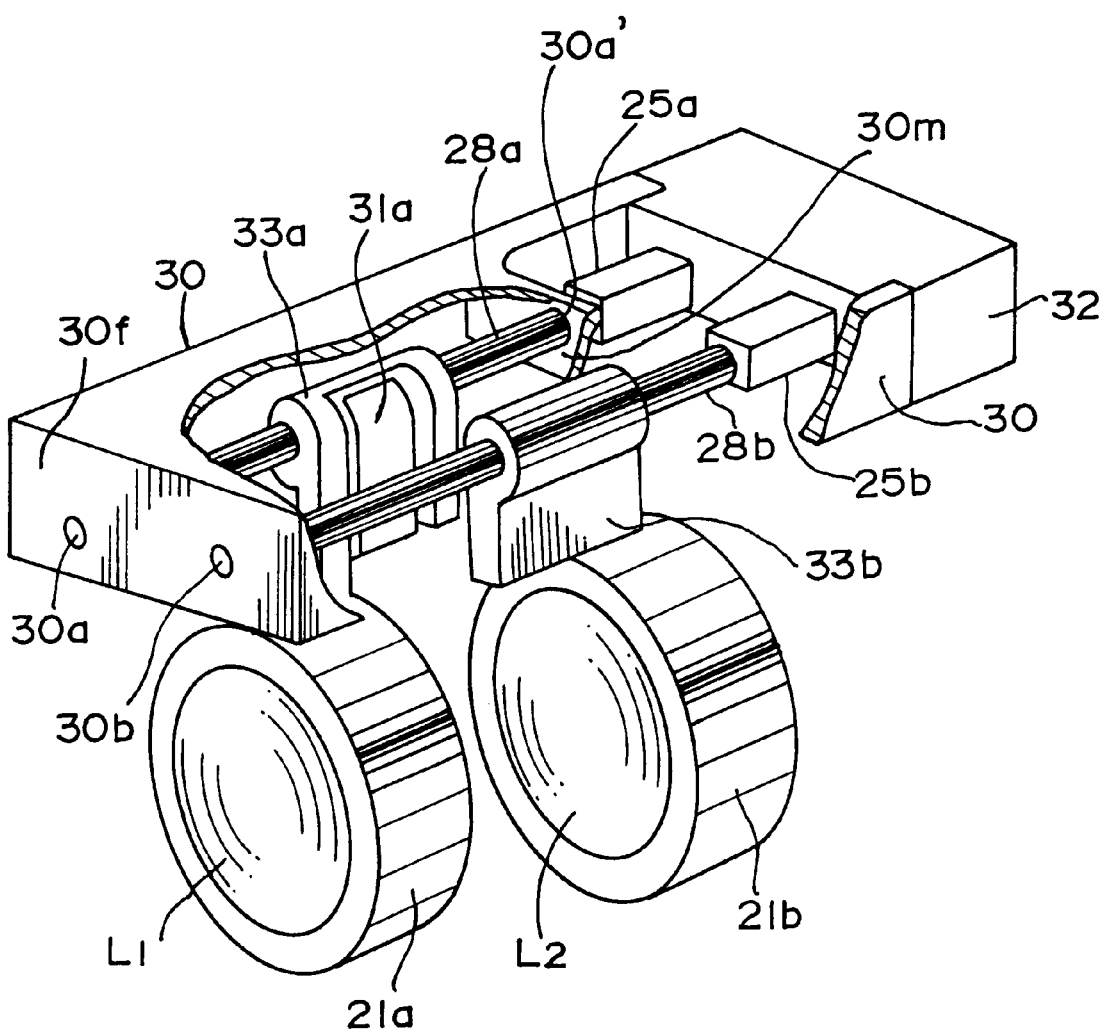
FIG. 1 is a perspective view showing a structure of the driving apparatus commonly used in the following embodiments.

Referring to the drawings, the embodiments of the present invention will be described.

FIG. 1 shows a structure of an interchangeable lens for a camera, which is common to the individual embodiments.

21a, 21b denote respective lens frames for holding lenses L1, L2. Guide shafts 28a, 28b for slidably guiding the respective lens frames 21a, 21b in the direction of an optical axis extend through respective bearing portions 33a, 33b disposed above the lens frames. The guide shafts 28a, 28b have their respective near-front and near-rear end portions held slidably lengthwise thereof in shaft holes 30a, 30b formed in a front wall 30f of a fixed frame 30 and in shaft holes 30a', 30b' (of which 30b' is not shown) formed in an inner wall 30m of the fixed frame 30.

The bearing portions 33a, 33b are provided with holding plates 31a, 31b (of which the holding plate 31b is hidden in the drawing) configured as leaf springs and attached to the bearing portions 33a, 33b with screws. The holding plates 31a, 31b are pressed against the guide shafts 28a, 28b. Accordingly, the lens frames 21a, 21b slide frictionally along the guide shafts 28a, 28b when the lens frames 21a, 21b move. Piezoelectric elements 25a, 25b are attached to the respective rear end portions of the guide shafts 28a, 28b. A fixed member 32 is secured to each of the rear end portions of the piezoelectric elements 25a, 25b. The fixed member 32 is attached to the fixed frame 30.

Figure 6:
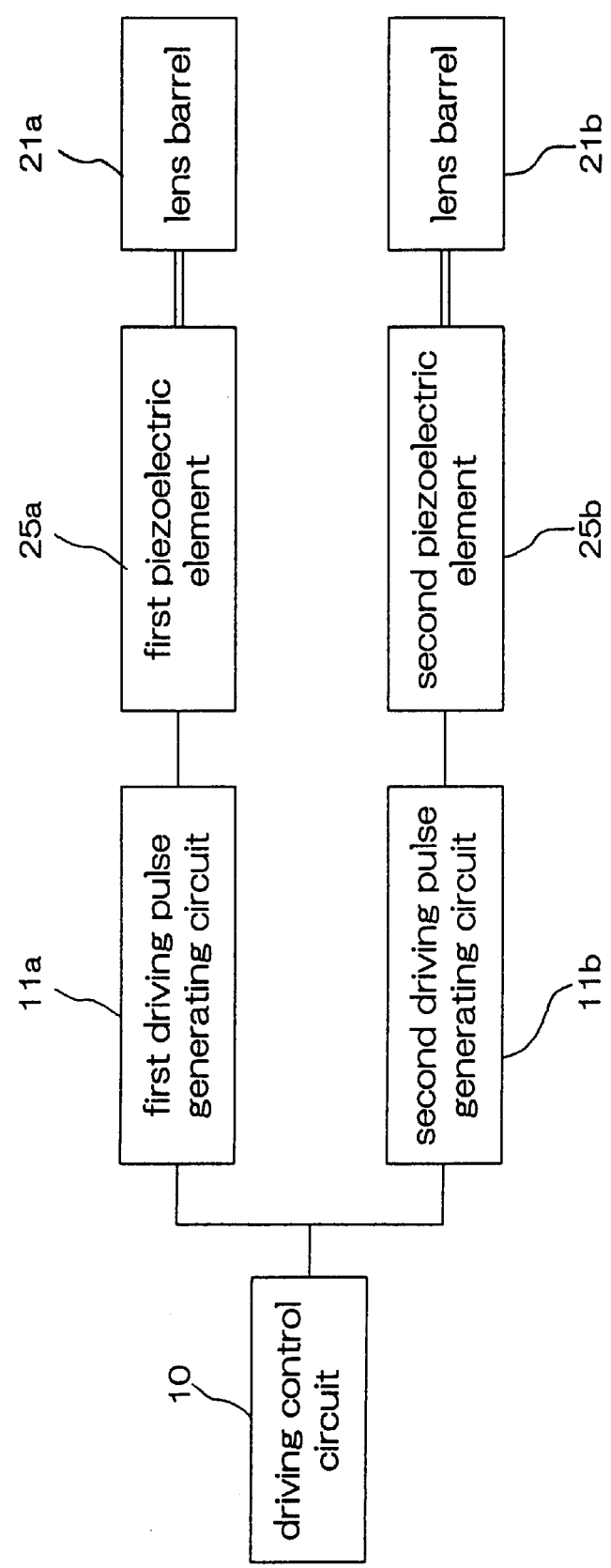
FIG. 6 is a control block diagram for the embodiments of the present invention.

FIG. 6 is a control block diagram, which is common to the individual embodiments. A drive control circuit 10 controls a first drive pulse generating circuit 11a for generating a first drive pulse applied to the first piezoelectric element 25a and a second drive pulse generating circuit 11b for generating a second drive pulse applied to the second piezoelectric element 25b. The first and second drive pulses extend or contract the piezoelectric elements 25a, 25b and thereby move the lens frames 21a, 21b.

Figure 7:
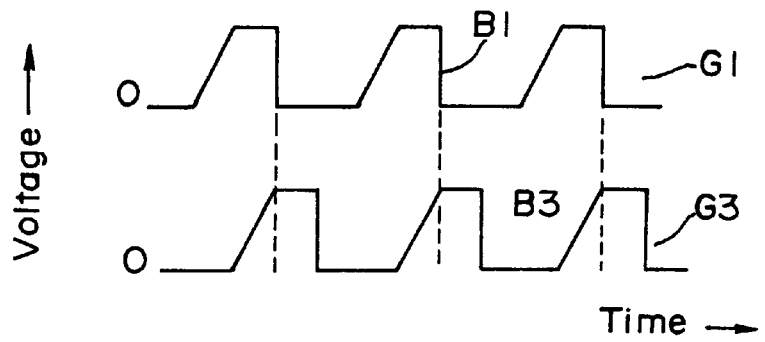
FIG. 7 is a view showing the waveform of a voltage applied to an electro-mechanical transducer in the first embodiment of the present invention.

FIG. 7 shows respective pulses for driving the two piezoelectric elements 25a, 25b, which are generated by the first and second drive pulse generating circuits 11a, 11b, i.e., first and second drive pulses G1, G3 in the first embodiment of the present invention. The vertical axis represents the magnitude of a voltage and the horizontal axis represents time, similarly to the second to fourth embodiments which will be described later. As shown in the drawing, the drive pulse G1 for the piezoelectric element 25a is shifted in phase from the drive pulse G3 for the piezoelectric element 25b such that the portion B1 with an abrupt voltage change of the drive pulse G1 does not coincide with the portion B3 with an abrupt voltage change of the drive pulse G3.

In the arrangement, even during rapid displacements under which the piezoelectric elements 25a, 25b abruptly extend or contract to cause enhanced acceleration, the fixed member 32 receives a force from either one of the piezoelectric elements 25a, 25b. As a result, the inertial mass of the fixed member 32 is used effectively without being distributed, so that the guide shafts 28a, 28b are efficiently accelerated. This permits the lens frames 21a, 21b and the lenses L1, L2 to be moved at high speed to specified positions, similarly to the case where the shaft for driving is only one, i.e., only one piezoelectric element, one shaft, and one moving member are provided.

Figure 8:
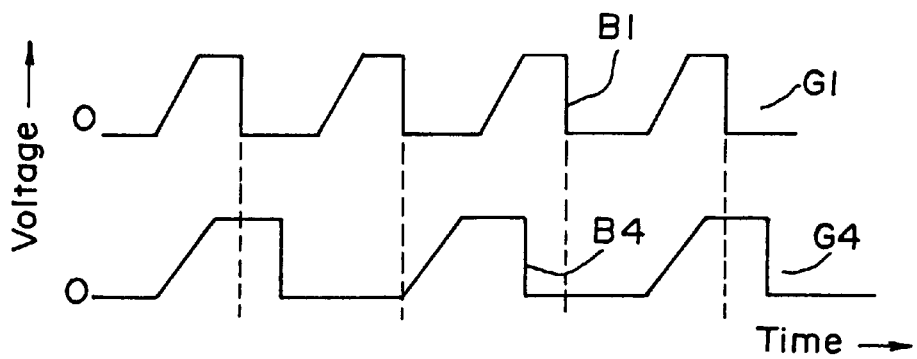
FIG. 8 is a view showing the waveform of a voltage applied to an electro-mechanical transducer in the second embodiment of the present invention.

FIG. 8 shows respective drive pulses G1, G4 for two piezoelectric elements 25a, 25b according to a second embodiment of the present invention. As shown in the drawing, the drive pulse G1 for the piezoelectric element 25a and the drive pulse G4 for the piezoelectric element 25b have different cycles. In this case also, the same effect as achieved by the first embodiment can be achieved by shifting the drive pulse G1 from the drive pulse G4 such that the portion B1 with an abrupt voltage change of the drive pulse G1 does not coincide with the portion B4 with an abrupt voltage change of the drive pulse G4.

Figure 9:
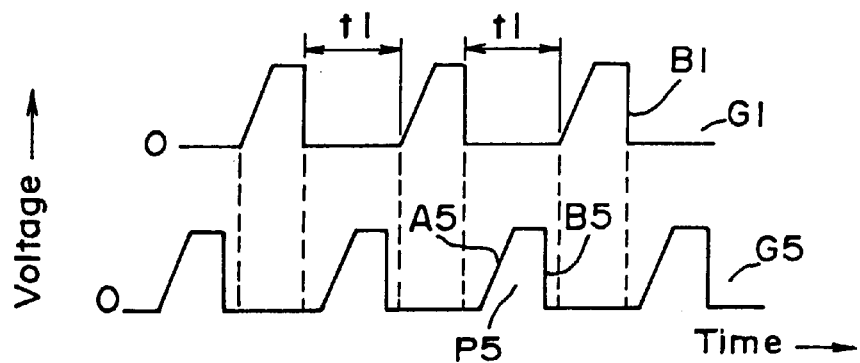
FIG. 9 is a view showing the waveform of a voltage applied to an electro-mechanical transducer in the third embodiment of the present invention.

FIG. 9 shows respective drive pulses G1, G5 for two piezoelectric elements 25a, 25b according to a third embodiment of the present invention. According to the drawing, the pulse P5 of the drive pulse G5 for the piezoelectric element 25b is generated during the period t1 in which no voltage change occurs in the drive pulse G1 for the piezoelectric element 25a.

The arrangement prevents the portion B5 with an abrupt voltage change of the drive pulse G5 from coinciding with the portion B1 with an abrupt voltage change of the drive pulse G1 and further prevents the portion A5 with a gentle voltage change of the drive pulse G5 from coinciding with the portion B1 with an abrupt voltage change of the drive pulse G1. This achieves the effect of preventing the degree of acceleration of the guide shaft 28a from being lowered due to the force applied by the piezoelectric element 25b to the fixed member 32 under slow displacement (see FIG. 1) when the piezoelectric element 25a is under rapid displacement, in addition to the same effect as achieved by the first embodiment. As a result, the distribution of the inertial mass of the fixed portion 32 is further suppressed, while the guide shaft 28a is accelerated more efficiently.

Figure 10:
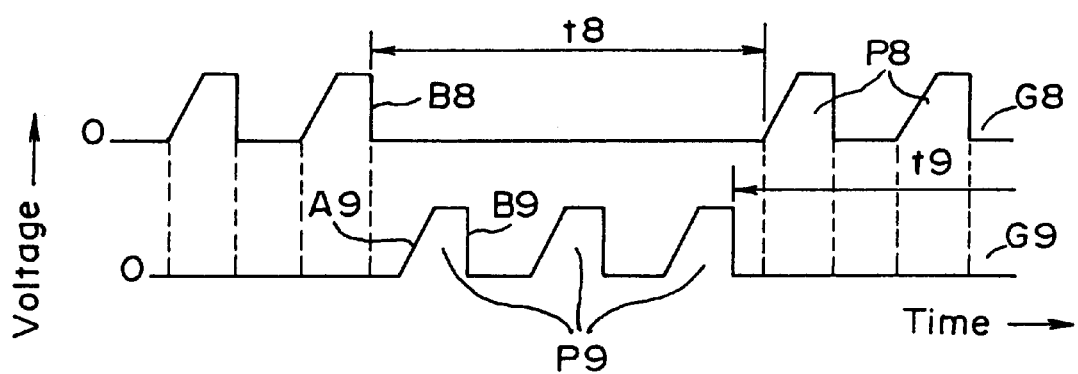
FIG. 10 is a view showing the waveform of a voltage applied to an electro-mechanical transducer in the fourth embodiment of the present invention.
Figure 11:
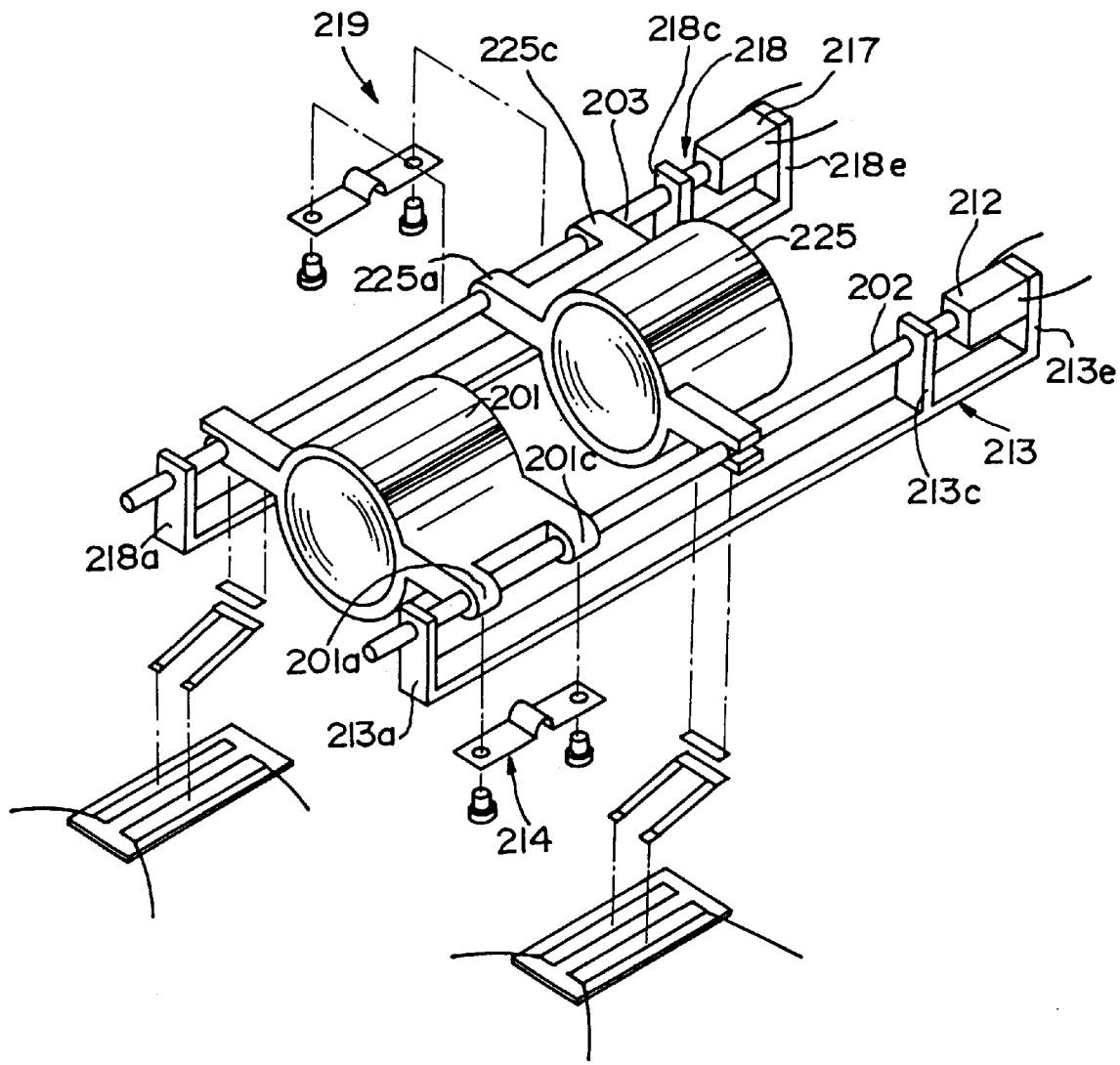
FIG. 11 is a view showing prior art.

FIG. 10 shows respective drive pulses G8, G9 for two piezoelectric elements 25a, 25b according to a fourth embodiment of the present invention. As shown in the drawing, the plural pulses P9 of the drive pulse G9 for the piezoelectric element 25b are generated during the period t8 in which no voltage change occurs in the drive pulse G8 for the piezoelectric element 25a, while the plural pulses P8 of the drive pulse G8 for the piezoelectric element 25a are generated during the period t9 in which no voltage change occurs in the drive pulse G9 for the piezoelectric element 25b.

This not only achieves the same effect as achieved by the third embodiment but also prevents, even if the respective drive pulses for the two piezoelectric elements 25a, 25b have different frequencies, the forces exerted by one piezoelectric element 25b under rapid displacement (B9) and under slow displacement (A9) from being applied to the fixed member 32 when the other piezoelectric element 25a is under rapid displacement, as indicated by B8. As a result, it becomes possible to prevent the degree of acceleration of the guide shaft 28a from lowering.

Figure 2:
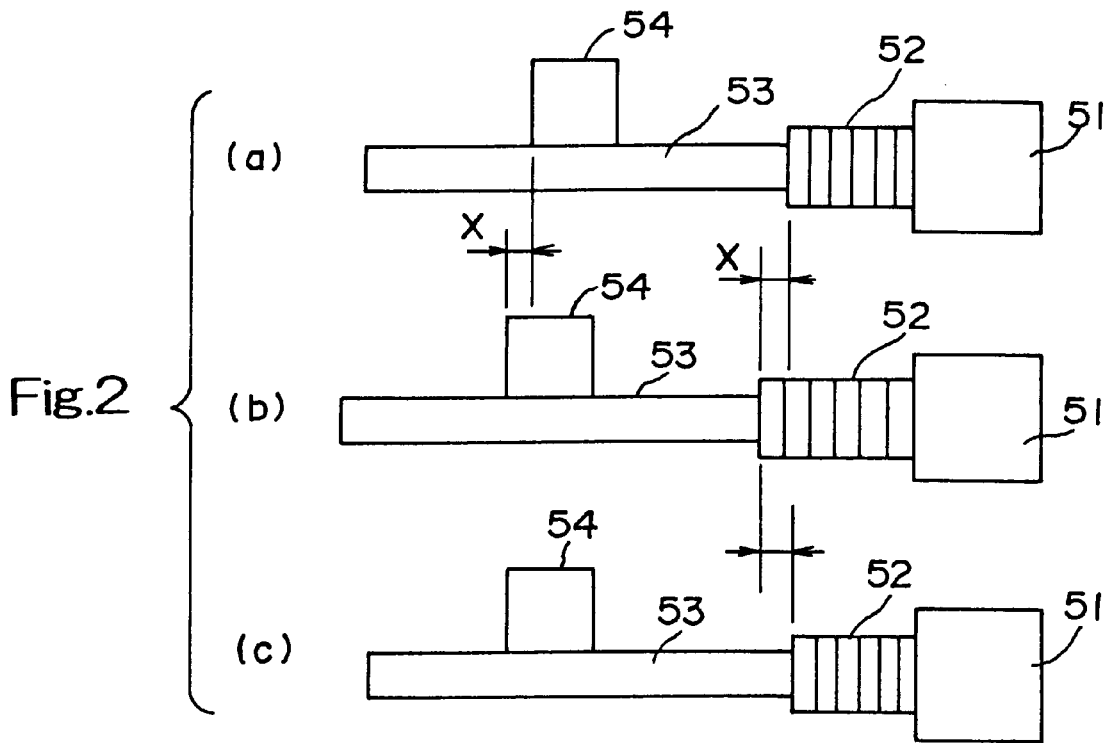
FIG. 2 is a view for illustrating the principle of operation of the driving apparatus of FIG. 1.
Figure 3:
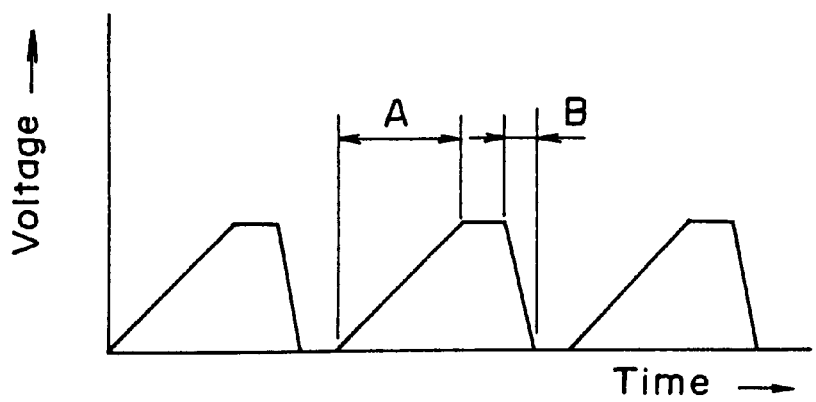
FIG. 3 is a view showing an example of the waveform of a voltage applied to an electro-mechanical transducer of FIG. 1.
Figure 4:
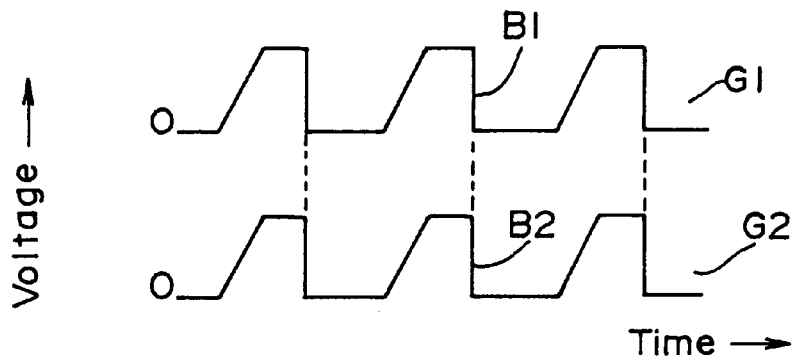
FIG. 4 is a view showing the waveform of the voltage applied to the electro-mechanical transducer of FIG. 1.

Although the description has thus been given to the driving apparatus shown in FIG. 2, which has shafts in two systems including two piezoelectric elements 25a, 25b secured to one fixed member 32, the same structure can be implemented if shafts in three or more systems are provided and the same effect can be achieved.

Figure 5:
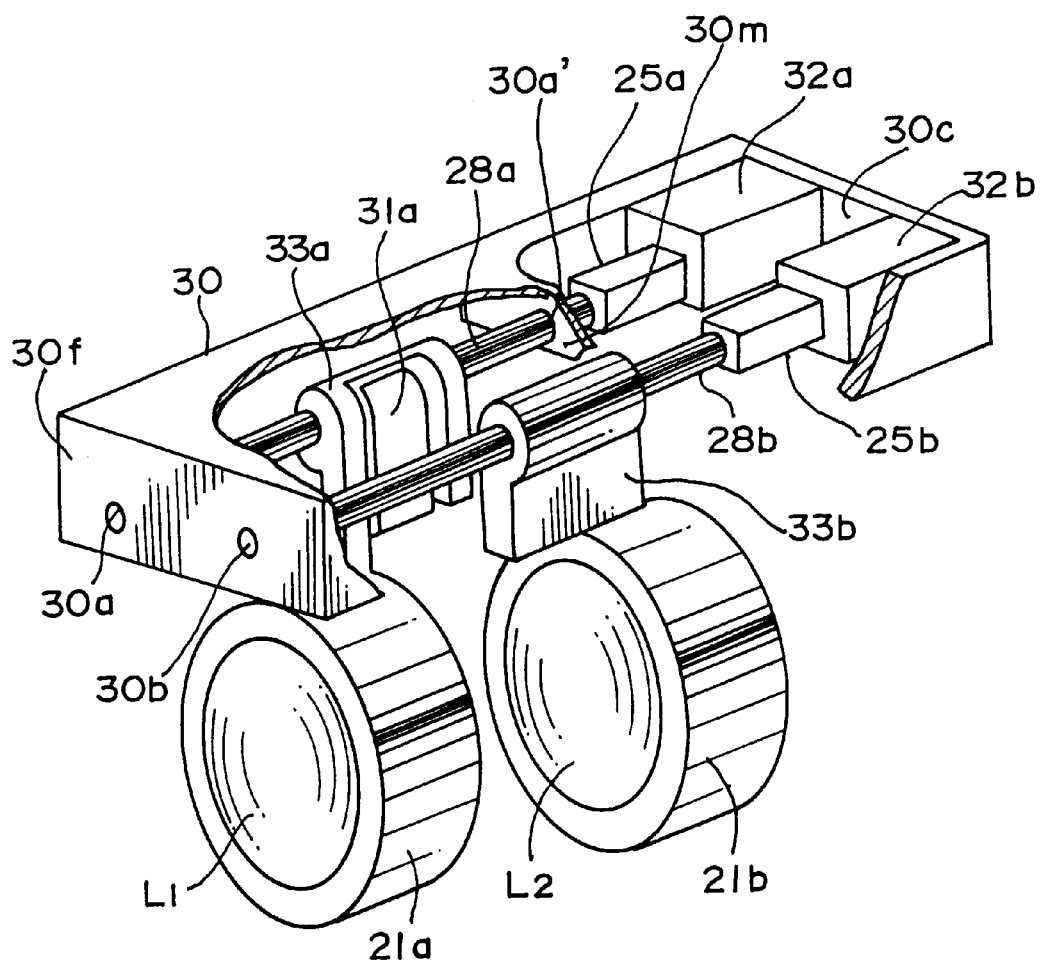
FIG. 5 is a perspective view showing another structure of the driving apparatus.

The same effect can be achieved even in the case where fixed members 32a, 32b are provided for the individual piezoelectric elements 25a, 25b on a one-by-one basis, as shown in FIG. 5. This prevents the forces from being applied simultaneously to the fixed members 32a, 32b and thereby prevents an increased force from being applied to the fixed frame 30 on which the fixed members 32a, 32b are mounted. As a result, it becomes possible to move the lens frames 21a, 21b and the lenses L1, L2 at high speed to specified positions by efficiently accelerating each of guide shafts 28a, 28b. The effect is particularly remarkable when the fixed frame is composed of an elastic body.

In each of the foregoing arrangements, when a plurality of electro-mechanical transducers are used to move moving members under repeated slow and rapid displacements, the rapid displacements of the respective electro-mechanical transducers do not coincide with each other, so that the member or portion on which the fixed member is mounted never receives the large forces applied simultaneously thereto. This prevents the lowering of the degree of acceleration of the shaft or guide shaft and the deterioration of the driving properties of the moving member, such as a lens. The effect of preventing the lowering of the degree to which the shaft is accelerated is particularly remarkable when the member on which the fixed portion is mounted is composed of an elastic body, such as a resin. Hence, it becomes possible to prevent the degradation of the operability of equipment on which the driving apparatus is mounted.

In using a plurality of electro-mechanical transducers to move moving members under repeated slow and rapid displacements, the rapid displacements of the respective electro-mechanical transducers do not coincide with each other, so that the fixed member never receives the large forces applied simultaneously thereto. This prevents the lowering of the degree of acceleration of the shaft or guide shaft and the deterioration of the driving properties of the moving member, such as a lens.

Furthermore, it becomes possible to prevent, when one electro-mechanical transducer is under rapid displacement, the fixed member or the member on which the fixed member is mounted from being accelerated by the other electro-mechanical transducer under rapid and slow displacements. Accordingly, the effect of preventing the lowering of the degree to which the shaft is accelerated is further enhanced, which permits more efficient acceleration of the shaft and further prevents the deterioration of the driving properties of the moving member, such as a lens.

Although each of the foregoing embodiments is a replacement lens for a camera, it will easily be appreciated that the present invention is also applicable to any equipment such as an X-Y table or a binocular.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving apparatus comprising:
    first and second electro-mechanical transducers each extending and contracting in a driving direction;
    first and second fixed portions secured to an end of the respective first and second electro-mechanical transducers;
    first and second shafts secured to an other end of the respective first and second electro-mechanical transducers to reciprocate with the extension and contraction of the aforesaid electro-mechanical transducers;
    first and second moving members held frictionally by the first and second shafts and simultaneously moved; and
    a drive pulse supplier for causing the slow and rapid displacements of each of the first and second electro-mechanical transducers by supplying drive pulses to the electro-mechanical transducers such that a period during which the first electro-mechanical transducer undergoes rapid displacement does not coincide with a period during which the second electro-mechanical transducer undergoes rapid displacement.

2. A driving apparatus according to claim 1, wherein the first and second electro-mechanical transducers are piezoelectric elements.

3. A driving apparatus according to claim 1, wherein the first and second fixed members are composed of a single member.

4. A driving apparatus according to claim 1, wherein a drive pulse for driving the second electro-mechanical transducer is outputted during the period in which no change occurs in the voltage applied the first electro-mechanical transducer.

5. A driving apparatus according to claim 1, wherein the period during which the first electro-mechanical transducer undergoes rapid displacement does not coincide with a period during which the second electro-mechanical transducer undergoes slow displacement.

6. An equipment having a driving device, said equipment comprising:
    first and second electro-mechanical transducers each extending and contracting in a driving direction;
    first and second fixed portions secured to an end of the respective first and second electro-mechanical transducers;
    first and second shafts secured to an other end of the respective first and second electro-mechanical transducers to reciprocate with the extension and contraction of the aforesaid electro-mechanical transducers;
    first and second moving members held frictionally by the first and second shafts and simultaneously moved;
    a drive pulse generator for generating drive pulses in order to cause the slow and rapid displacements of each of the first and second electro-mechanical transducers; and
    a controller for supplying the driving pulses to the electro-mechanical transducers such that a period during which the first electro-mechanical transducers undergoes rapid displacement does not coincide with a period during which the second electro-mechanical transducers undergoes rapid displacement.

7. An equipment according to claim 6, wherein the first and second electro-mechanical transducers are piezoelectric elements.

8. An equipment according to claim 6, wherein the first and second fixed members are composed of a single member.

9. An equipment according to claim 6, wherein a drive pulse for driving the second electro-mechanical transducer is outputted during the period in which no change occurs in the voltage applied the first electro-mechanical transducer.

10. An equipment according to claim 6, wherein the period during which the first electro-mechanical transducer undergoes rapid displacement does not coincide with a period during which the second electro-mechanical transducer undergoes slow displacement.

11. A driving apparatus comprising:
    first and second electro-mechanical transducers each repeats rapid and slow displacement alternately;
    first and second moving members simultaneously moved by the displacement of the first and second electro-mechanical transducers; and
    a drive pulse supplier for causing the slow and rapid displacements of each of the first and second electro-mechanical transducers by supplying driving pulses to the electro-mechanical transducers such that a period during which the first electro-mechanical transducer undergoes rapid displacement does not coincide with a period during which the second electro-mechanical transducer undergoes rapid displacement.

12. A driving apparatus according to claim 11, wherein the first and second electro-mechanical transducers are piezoelectric elements.

13. A driving apparatus according to claim 11, wherein a drive pulse for driving the second electro-mechanical transducer is outputted during the period in which no change occurs in the voltage applied the first electro-mechanical transducer.

14. A driving apparatus according to claim 11, wherein the period during which the first electro-mechanical transducer undergoes rapid displacement does not coincide with a period during which the second electro-mechanical transducer undergoes slow displacement.

15. An equipment having a driving apparatus according to claim 11, comprising:
   a drive pulse generator for generating drive pulses; and
   a controller for controlling the waveform of the drive pulses supplied to the electro-mechanical transducers via the drive pulse supplier.

16. An equipment according to claim 15, wherein the first and second electro-mechanical transducers are piezoelectric elements.

17. An equipment according to claim 15, wherein a drive pulse for driving the second electro-mechanical transducer is outputted during the period in which no change occurs in the voltage applied the first electro-mechanical transducer.

18. An equipment according to claim 15, wherein the period during which the first electro-mechanical transducer undergoes rapid displacement does not coincide with a period during which the second electro-mechanical transducer undergoes slow displacement.

* * * * *